United States Patent [19]

Berwick et al.

[11] 4,208,676
[45] Jun. 17, 1980

[54] TELEVISION PROJECTION SYSTEM

[75] Inventors: Leonard J. Berwick, 1215 Clubhouse Rd., Gladwyn, Pa. 19035; Jay I. Weiss, Lafayette Hill; Norman M. Besden, Norristown, both of Pa.

[73] Assignee: Leonard J. Berwick, Gladwyn, Pa.

[21] Appl. No.: 870,104

[22] Filed: Jan. 17, 1978

[51] Int. Cl.² ............................................. H04N 5/74
[52] U.S. Cl. ................................. 358/237; 358/250; 358/255; 358/60; 358/231
[58] Field of Search ............... 358/231, 237, 250, 255, 358/284, 60; 358/175 R; 353/119

[56] References Cited

U.S. PATENT DOCUMENTS

| | | | |
|---|---|---|---|
| 2,186,570 | 1/1940 | Batchelor | 358/237 |
| 2,287,307 | 6/1942 | Herbst | 358/254 |

Primary Examiner—Robert L. Richardson
Assistant Examiner—Edward L. Coles
Attorney, Agent, or Firm—Morton J. Rosenberg

[57] ABSTRACT

A television projection system for producing an enlarged television image on a projection screen positionally located at a remote point from a standard television set. A tubular housing is mounted adjacent to a cathode ray tube screen of the television set. The tubular housing extends in a longitudinal direction and includes a first end having a lens tube housing displaceably movable with respect to the overall tubular housing. The lens tube housing contains a single plano-convex lens element which is utilized for enlarging the image produced from the cathode ray tube screen onto the remotely located projection screen. A switching element comprising a double throw, double pole switch is mounted on the television set and electrically coupled to the vertical deflection circuit in order to provide a vertically inverted and transversely reversed image. The inverted and reversed image is passed through the plano-convex lens where it is inverted and reversed to provide an appropriate image on the projection screen.

29 Claims, 4 Drawing Figures

TELEVISION PROJECTION SYSTEM

BACKGROUND OF THE INVENTION

1. Field of the Invention

This invention is directed to television projection systems. In particular, this invention is directed to television projection systems for providing an enlarged image on a remotely located screen from a standard television image producer. More in particular, this invention relates to a television projection system which includes an extended housing member having a predetermined contour for optimizing the image being emitted from the television screen for projection through a single lens element.

2. Prior Art

Television projection systems for producing enlarged television images on remotely located projection screens are known in the art. Some prior art television projection systems such as that shown in U.S. Pat. No. 3,800,085 provide for an optical housing placed in front of the television set and a reversing switch mechanism located on the television set for inverting and reversing the image. However, such prior art systems provide for a plurality of optical lenses for projecting the image onto a remote screen. Such objective lens systems are generally complex and utilize the multiplicity of lens elements to provide the necessary image. The plurality of lens elements have a degrading effect on the final optical properties of the image being projected onto a remote screen. The housing containing the optical lens system of such prior art designs are not optimally contoured for utilizing the emitted image from the television cathode ray screen in an optically optimal manner.

In some other prior art systems, such as that shown in U.S. Pat. No. 3,037,072, an inverting switch mechanism is utilized in conjunction with a light funnel housing to project images on a remote screen from a television set. However, the television sets of such prior systems are wired to provide the inverting and reversing of the image passing from the television screen and there is no switch mechanism for inversion and reversal of the television set screen at the discretion of the user.

Other types of television projection systems for producing enlarged images are generally directed to complicated optical systems which utilize a number of mirror elements, as well as lens elements to provide the appropriate projection image. Such systems are complicated in nature and are generally incorporated into housing systems which do not allow the user to view the television set in a normal fashion.

In some other prior television projection systems, the television set must be inverted to provide the appropriate projection on a remote screen. Such systems do not permit the television set to be utilized in a normal fashion without inverting the entire television set.

SUMMARY OF THE INVENTION

A television projection system for producing an enlarged televison image at a remote area which is longitudinally displaced from a screen of a cathode ray tube within a television set where the screen portrays a standard image for viewing. The projection system includes a shroud member which extends in the longitudinal direction and has a decreasing cross-sectional area in a plane substantially normal to the longitudinal direction throughout at least a portion of the longitudinal extension. An optical enlarging member is displaceably mounted to a first end of the shroud member. The shroud member has a second end which is longitudinally displaced from the first end and is adapted to be positionally located adjacent the cathode ray tube screen of the television set. A switch inversion mechanism is electrically connected to the vertical deflection circuit of the television set. The switch inversion mechanism provides a first setting where the image on the screen of the television set is vertically inverted and reversed in a transverse direction. Additionally, a second setting of the switch inversion mechanism is provided in order that a standard image is projected from the cathode ray tube screen of the television set for normal viewing.

DESCRIPTION OF THE PREFERRED EMBODIMENTS

Figure 1:
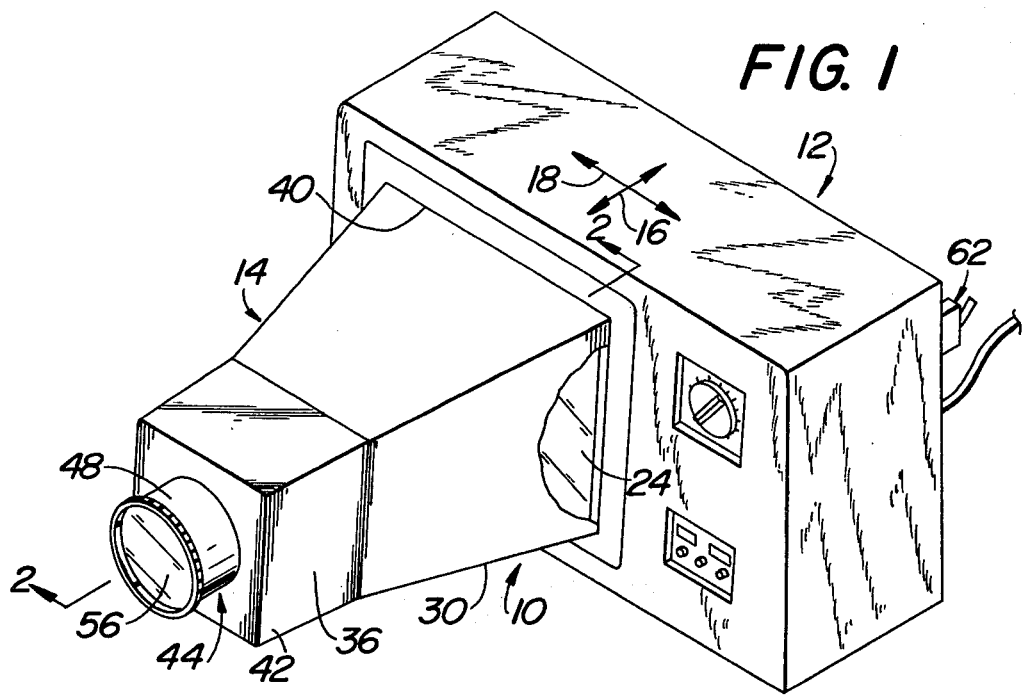
FIG. 1 is a perspective view of the television projection system partially in cut-away to show the mounting of the shroud member adjacent to the cathode ray tube screen.
Figure 2:
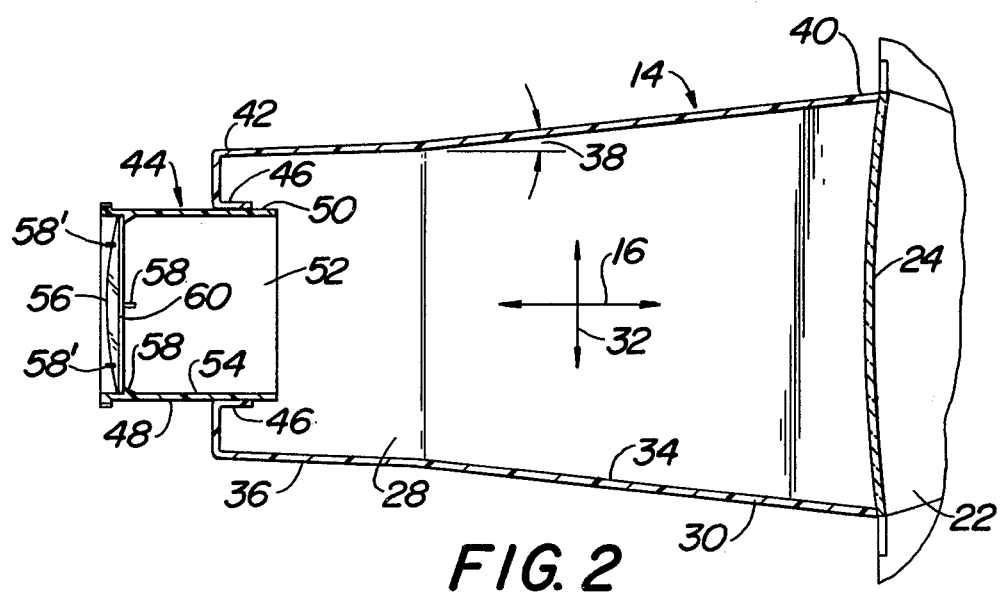
FIG. 2 is an elevation view of the shroud member and the optical enlarging member taken along the section line 2—2 of FIG. 1.
Figure 3:
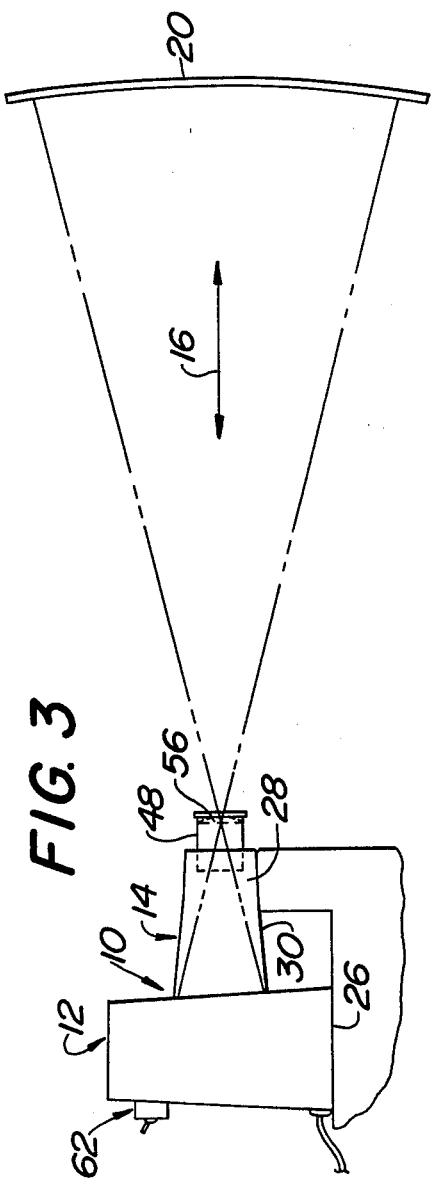
FIG. 3 is a side view of the television projection system showing an image being projected onto a remotely located projection screen; and, FIG. 4 is a partial schematic diagram of a switch inversion mechanism for providing a transversely reversed image on the screen of a television set.
Figure 4:
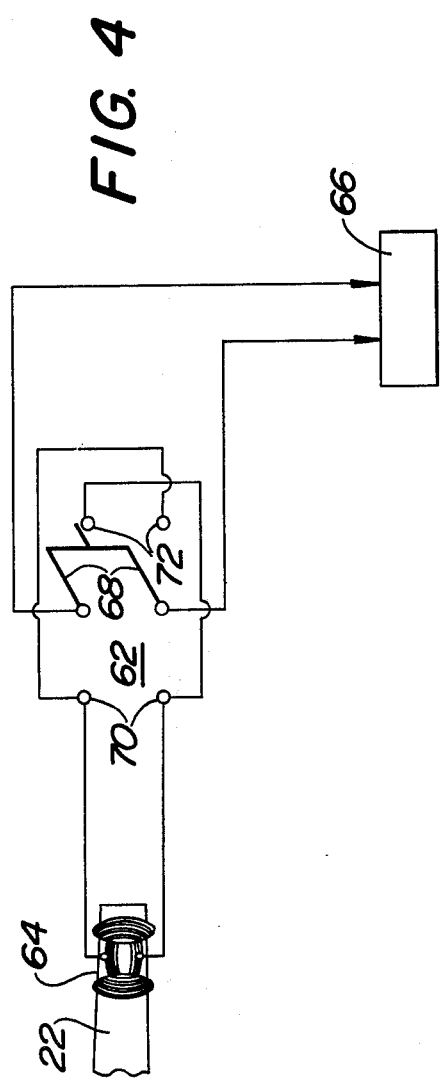

Referring now to FIGS. 1-4, there is shown television projection system 10 for producing an enlarged television image at a remote area defined by projection screen 20 shown in FIG. 3. As will be seen in following paragraphs, television projection system 10 is provided to project a clear enlarged image on projection screen 20 utilizing an optically functional set of elements in combination with standard television set 12. Projection system 10 is designed to provide a low cost and highly optically maximized enlarging system which allows television set 12 to be utilized as an image projection system or at the discretion of the user to be used for normal viewing.

Television set 12 utilized in television projection system 10 as is herein described may be a standard, commercially available television set 12, well known in the art. Set 12 includes cathode ray tube 22 having screen 24 upon which a particular image is portrayed. For purposes of discussion, television set 12 is considered to be mounted on base surface 26 which may be a stand or other mounting device not important to the inventive concept as is herein described. The main consideration being that television set 12 is mounted in an appropriate positional placement for normal viewing by a user whether television set 12 is utilized for projection of an image on screen 20 or if set 12 is being normally viewed.

Television projection system 10 includes shroud member 14 which extends in longitudinal direction 16 defining through opening or passage 28. Shroud or tubular housing 14 has a decreasing internal cross-sectional area in a plane substantially normal to longitudinal direction 16 throughout a longitudinal extension of first portion 30 of housing 14. The decreasing cross-sectional area plane is defined by the plane location described by the plane of transverse directional arrow 18 and vertical directional arrow 32. The contour of tubular housing 14 decreases in substantially a linear manner when taken with respect to the hereinbefore described cross-sectional area in longitudinal direction 16 as is clearly shown in FIG. 2. Tubular housing 14 provides for a trapezoidal volume contour throughout the decreasing cross-sectional area portion 30.

The decreasing cross-sectional area of first portion 30 of shroud 14 has been found to be important when taken with respect to the image being passed from screen 24. Apparently, light images are found to impinge on shroud or housing inner wall 34. A portion of this light is absorbed and a further portion is reflected from inner wall 34. By inclining portion 30 in a linearly decreasing cross-sectional area manner, the reflected light is found to apparently be directed away from second portion 34 of shroud 14. Since portion 36 contains the appropriate optical imaging element, stray light is optically directed away in order that the full image from screen 24 may pass therethrough without being interfered with by reflected light from shroud inner wall 34. As can be seen in FIGS. 1 and 2, shroud second portion 36 provides for a substantially constant cross-sectional area when taken with respect to longitudinal direction 16. Angle 38 defining the inclination of first portion 30 with respect to second portion 36 has been found useful in the range approximating 5°–10° with approximately a 6° angle being utilized in practice. In general, tubular housing or shroud member 14 may be formed in one piece formation from a plastic composition material or some like composition generally adaptable, but not specifically necessary to a molding process.

One of the major problems associated with any television projection system is the fact that there is a predetermined image intensity being emitted from screen 24 of television set 12. Since this intensity cannot be increased in a standard system without derogatory effects, it is of paramount importance that as much light intensity being emitted from screen 24 be projected onto screen 20. The particular contouring of shroud 14 within first portion 30 has been found to aid in reducing reflected and other stray light from being mixed with the projected image from screen 24. Additionally, it will be noted that shroud second end 40 is generally located in an adjacent and substantially contiguous manner to screen 24 of cathode ray tube 22 in order to optimally capture the light image being passed from screen 24.

In order to further diminish any reflected light impinging on inner wall 34 of shroud or tubular housing 14, inner wall 34 may be coated with a substantially black coating having a high absorptivity for the visible portion of the electromagnetic spectrum. One black paint which has been successfully used is produced by Minnesota Mining and Manufacturing Company under the Trade Name 3M Black Veltex, which has been found to have approximately 93% absorptivity of the visible electromagnetic spectrum. Although a black paint or coating may generally be used, it is to be understood that other paints or coatings may be applied if such have a high absorptivity percentage in the visible portion of the electromagnetic spectrum. Thus, inner wall 34 may be painted or otherwise coated with a high absorptivity and low reflectivity coating in order to reduce any reflection anomalies which may occur. The reflection problem may further be reduced by utilizing a matted type surface or dimpled surface which would roughen inner wall 34. Additionally, inner wall 34 may be sand blasted in order to increase the roughening characteristics. This roughening of the surface of inner wall 34 further increases the absorption of the particular portion of the electromagnetic spectrum which is of concern in the visible range. Thus, by utilizing a series of elemental considerations, the visible light passing external to tubular housing or shroud member 14 is maximized in intensity as well as quality with an appropriate reduction in light aberration.

Television projection system 10 further includes optical enlarging mechanism 44 which is displaceably mounted and locationally movable with respect to shroud or tubular housing member 14 and is mounted within shroud first end 42 as is clearly seen in FIGS. 1 and 2. Optical enlarging mechanism 44 matingly engages and interfaces with internally directed channel type flange 46 to allow movement of optical enlarging mechanism in reversible longitudinal direction 16 for a clear image projection on screen 20.

Optical enlargement mechanism 44 includes lens tube housing 48 which is slidably displaceable with respect to first end 42 of shroud 14 at the interface defined between channel flange 46 and tube wall 50 as is seen in FIG. 2. Tube housing 48 defines lens tube passage 52 having a cross-sectional area lying in a plane substantially normal longitudinal direction 16. The cross-sectional area defined by lens tube passage 52 is substantially less than the cross-sectional area of shroud second portion 36. Thus, the optical portion of television projection system 10 does not interface with the entire image area of screen 24. The optical element is mounted within a cross-sectional area substantially less than the viewing area from screen 24. This allows the reduction of spherical aberrations being projected from lens tube housing 48 through the optical element to be further described in following paragraphs. In actual practice, the cross-sectional area around first end 42 of shroud 14 approximates 64 square inches. In contradistinction, the cross-sectional area of lens tube passage 52 approximates 20 square inches, which results in approximately a one-third reduction of the area of first end 42. Of further consequence, the cross-sectional area at shroud second end 40 approximates 120 square inches and the cross-sectional area ratio of lens tube passage 52 with respect to shroud second end 40 is approximately 17%. As has previously been described, this reduction in area for the projecting image has reduced an important optical anomaly namely spherical aberrations being projected.

In overall contour, lens tube housing 48 is generally formed in a circular manner to provide ease of construction. Similarly, channel flange 46 is correspondingly circular in nature to allow sliding contact and displacement in longitudinal direction 16 of optical enlarging mechanism 44 with respect to shroud member 14. Lens tube housing 48 inner walls 54 may be coated or painted with a high absorptivity coating similar to the coating or paint utilized on shroud inner wall 34. Additionally, inner walls 54 of lens tube housing 48 may be roughened to further increase the absorption of the visible portion of the electromagnetic spectrum. Thus, in combination, inner walls 54 are either matted, dimpled, or otherwise roughened and coated with the high absorption coating to minimize reflections passing from the image emitted from screen 24.

Optical enlarging mechanism 44 further includes single lens element 56 mounted within lens tube housing 48 for projecting an enlarged image onto a remote area such as projection screen 20 as is seen in FIG. 3. Single lens element 56 is of the plano-convex type and has successfully been utilized with an approximate 17" focal length. However, lens element 56 may be produced having a predetermined focal length within the range 5.0"-20.0". The external diameter of lens element 56 approximates 4¾" and is adapted for mounting within lens tube housing 48. In the preferred embodiment, single lens element 56 is formed of a plastic material from sheet stock methyl methacrylate polymer which is commonly referred to as Plexiglass G. Utilization of this type of plastic composition allows for single lens element 56 to be machined such as being drilled or tapped and mounted in a collar, if such is necessary. Such utilization of this plastic material composition allows for the hereinbefore described machining operations to be performed with a minimal of special tooling associated with such operations. Further, the plastic composition as herein described, provides for a resilience which allows the lens to be snapped into positional placement within lens tube housing 48 as will be hereinafter described. Lens tube housing inner walls 54 may include lug members 58 extending slightly radially inward for insertion thereof of lens element 56. A plurality of lug members 58' are longitudinally displaced from lug members 58 in order that lens element 56 may be positionally inserted between pairs of radially extending lugs 58 and 58'. In this manner, plano-convex lens 58 may be longitudinally inserted within passage 52 of lens tube housing 48 to be captured between opposing longitudinally displaced lug members 58 and 58'. This mounting of lens element 56 within lens tube housing 48 provides for ease of construction and manufacture of television projection system 10 as is herein described.

Lens tube housing 48 extends in longitudinal direction 16 throughout a predetermined length. The predetermined length of lens tube housing 48 is provided to form a non-intercepting linear path from all points on cathode ray tube screen 24 through substantially central point or node 60 of lens element 56. Although highly dependent upon the geometry of shroud or tubular housing member 14, with the configuration as provided in actual practice, the overall length in longitudinal direction 16 of shroud member 14 has been successfully used in the approximate range of 18"-22". The extension length of lens tube housing 48 has been found usable in the range of 1.5"-6.5".

The importance of utilizing single plano-convex lens element 56 in opposition to a compound lens projection system is that although a compound projection optical system does increase the image resolution, it has been found that such compound lens systems result in raster patterns on the image formed in an enlarged manner on projection screen 20. Additionally, the colors become diluted and the brilliance was found to be reduced by a substantial amount when utilization of compound lenses is provided. This has the final effect of providing an optical image which has turned out to be less sharp and minimized in its color projection.

Television projection system 10 further includes switch inversion mechanism 62 which is electrically coupled to the vertical deflection circuit of television set 12. Switch inversion mechanism 62 includes a first setting for providing an image on screen 24 which is vertically inverted and reversed in transverse direction 18. Additionally, a second setting is provided where the standard image on cathode ray tube screen 24 is provided in a manner that television set 12 may be normally viewed by a user.

Switch inversion mechanism 62 is mounted external to television set 12 generally on a rear surface thereof for purposes of convenience. Switch inversion mechanism 62 is formed in a cross-connected type arrangement, as provided in FIG. 4. Switch inversion mechanism 62 is coupled between vertical deflection yoke 64 and vertical deflection amplifier 66. Both vertical deflection yoke 64 and vertical deflection amplifier 66 are of the standard type with the only difference being the insertion of switch inversion mechanism 62 as will be further described in following paragraphs. Switch mechanism 62 is substantially a double throw, double pole switch adapted for insertion into the vertical circuit of standard television set 12. The second setting is provided when switch leads 68 are brought into contact with contact members 70 which merely couples vertical deflection amplifier 66 to vertical deflection yoke 64 in the normal manner provided in standard television sets 12. When switch elements 68 are brought into contact with reverse contacts 72, a first setting is provided where the image is vertically inverted and reversed in transverse direction 18 as has hereinbefore been described. Contact of switch elements 68 with contact members 72 provide for a cross-coupling of vertical deflection amplifier system 66 with vertical deflection yoke system 64 to provide the reversed and inverted image on screen 24. In this manner, when switch elements 68 are moved into electrical contact with contact members 70, television set 12 may be viewed by a user in a normal operation. Alternatively, when switch elements 68 are moved into electrical coupling with reverse contact members 72, the image on screen 24 is inverted and reversed and adapted for projection through housing 14 for enlargement of the image on projection screen 20.

Although this invention has been described in connection with specific forms and embodiments thereof, it will be appreciated that various modifications other than those discussed above may be resorted to without departing from the spirit or the scope of the invention. For example, equivalent elemental structures may be substituted for those specifically shown and described, certain features may be used independently of other features, and in some cases, elements may be reversed, all without departing from the spirit or scope of the invention as defined in the appended claims.

What is claimed is:

1. A television projection system for producing an enlarged television image at a remote area displaced from a screen of a cathode ray tube within a television set, said screen portraying a standard image for viewing, comprising:
   (a) shroud means extending in a longitudinal direction having a decreasing cross-sectional area in a plane substantially normal said longitudinal direction throughout at least a portion of said longitudinal extension; said shroud means being (1) displaceable from said television set for viewing said standard image, and, (2) adjacently located with respect to said television screen for viewing said enlarged television image;
   (b) optical enlarging means displaceably mounted to a first end of said shroud means, said shroud means having a second end longitudinally displaced from said first end and adapted to be positionally located adjacent said cathode ray tube screen, said optical enlarging means including a single lens element for projecting said enlarged image to said remote area, said single lens element being mounted within a lens tube housing longitudinally displaceable with respect to said first end of said shroud means; and, (c) switch inversion means electrically actuatable external said television set and connected to a vertical deflection circuit of said television set having (1) a first setting for providing an image on said screen which is vertically inverted and reversed in a transverse direction to said longitudinal direction; and (2) a second setting for providing said standard image on said cathode ray tube screen.

2. The television projection system as recited in claim 1 where said shroud means substantially linearly decreases in said cross-sectional area in said longitudinal direction.

3. The television projection system as recited in claim 1 where said shroud means includes a roughened inner wall surface for increasing absorption of said portion of said electromagnetic spectrum.

4. The television projection system as recited in claim 2 where said shroud means includes a trapezoidal volume contour throughout said decreasing cross-sectional area portion.

5. The television projection system as recited in claim 4 where said shroud means includes a substantially black inner wall surface coating for absorbing a portion of the electromagnetic spectrum.

6. The television projection system as recited in claim 1 where said shroud means includes a substantially constant cross-sectional area portion in a plane substantially normal said longitudinal direction.

7. The television projection system as recited in claim 6 where said lens tube housing includes a tube wall dimension in said longitudinal direction of less than a predetermined length, said predetermined length providing a non-intercepting linear path from all points on said cathode ray tube screen through a substantially central point of said lens element.

8. The television projection system as recited in claim 6 where said lens tube housing includes a cross-sectional area in a plane substantially normal said longitudinal direction, said lens tube housing cross-sectional area being substantially less than said shroud means cross-sectional area.

9. The television projection system as recited in claim 8 where said lens tube housing is substantially circular in cross-sectional area.

10. The television projection system as recited in claim 9 where said lens tube housing includes a substantially black inner wall surface coating for absorbing a portion of the electromagnetic spectrum.

11. The television projection system as recited in claim 9 where said lens tube housing includes a roughened inner wall surface for increasing absorption of a portion of the electromagnetic spectrum.

12. The television projection system as recited in claim 1 where said single lens element is a plano-convex lens element.

13. The television projection system as recited in claim 12 where said plano-convex lens element includes approximately a seventeen inch focal length.

14. The television projection system as recited in claim 13 where said single lens element is formed of a plastic material.

15. The television projection system as recited in claim 14 where said single lens element is injection molded.

16. The television projection system as recited in claim 1 where said switch inversion means is electrically coupled between a vertical deflection yoke and a vertical deflection amplifier of said television set.

17. The television projection system as recited in claim 16 where said first setting of said switch inversion means provides an electrical cross-connection between said vertical deflection yoke and said vertical deflection amplifier.

18. The television projection system as recited in claim 17 where said switch inversion means is a double-pole, double-throw switch member.

19. A television projection system for providing an enlarged television image on a remotely located projection screen, comprising:

(a) a tubular housing extending in a longitudinal direction having a decreasing cross-sectional area in said longitudinal direction, said tubular housing having a second end adapted to be (1) located adjacent a cathode ray tube screen of a television receiver for viewing said enlarged television image, and (2) displaceable from said cathode ray screen for viewing a standard television image;

(b) a lens tube housing insertable within a first end of said tubular housing, said lens tube housing being reversibly displaceable in said longitudinal direction;

(c) a single lens element secured within said lens tube housing, said single lens element for magnifying an image from said television screen in a vertically inverted and horizontally reversed manner; and, (d) switch inversion means actuatable external said television receiver and electrically connected to a vertical deflection circuit of said television receiver for vertically inverting and horizontally reversing said image from said screen of said television receiver prior to said image passage to said lens element.

20. The television projection system as recited in claim 19 where said decreasing cross-sectional area of said tubular housing is substantially linear in said longitudinal direction.

21. The television projection system as recited in claim 10 where said lens tube housing is slidably displaceable in said longitudinal direction with respect to said tubular housing.

22. The television projection system as recited in claim 21 where said lens tube housing is cylindrical in contour having a circular cross-sectional area substantially less than said decreasing cross-sectional area of said tubular housing.

23. The television projection system as recited in claim 19 where said single lens element is a plano-convex lens having a lens axis line passing substantially in said longitudinal direction.

24. The television projection system as recited in claim 23 where said single lens element includes a focal length within the approximate range of 5.0–20.0 inches.

25. The television projection system as recited in claim 24 where said single lens element includes a focal length approximating 17.0 inches.

26. The television projection system as recited in claim 23 where said single lens element is formed of a plastic material.

27. The television projection system as recited in claim 26 where said single lens element is formed of a methyl methacrylate polymer composition.

28. The television projection system as recited in claim 27 where said single lens element is formed by injection molding.

29. The television projection system as recited in claim 23 where said single lens element is formed of a glass composition.

* * * * *